Sept. 21, 1954  P. E. VAN HORN  2,689,750
TRAILER HITCH WITH AUXILIARY SAFETY CONNECTIONS
Filed Oct. 29, 1951

INVENTOR.
Perry E. Van Horn
BY
Attorney

Patented Sept. 21, 1954

2,689,750

UNITED STATES PATENT OFFICE 2,689,750

TRAILER HITCH WITH AUXILIARY SAFETY CONNECTIONS

Perry E. Van Horn, Grand Rapids, Mich.

Application October 29, 1951, Serial No. 253,650

3 Claims. (Cl. 280—457)

This invention relates to trailer hitches, a type of coupling unit used to connect a trailer to a towing vehicle. The number of trailers in general use on our highways and the danger resulting from the failure of a coupling unit have focused a great deal of attention upon the development of a safety device adapted to hold a trailer on failure of the primary attachment. The type of articulation required of such a device makes the use of auxiliary safety attachments rather troublesome to design. Not only must there be freedom of movement about a vertical axis as the vehicles turn a corner, but a considerable amount of hinge action on a horizontal axis also takes place as the pulling vehicle and the trailer go over bumps or sharply-crested hills.

The usual trailer hitch centers primarily in a bolt acting as a hinge pin and arranged on a vertical axis. Either an auxiliary hinge establishing a freedom of movement about a horizontal axis is used in connection with the vertical bolt, or enough play is permitted in the connection to establish the required freedom of movement. To avoid the danger resulting from the failure of the primary hinge connection, it is the usual custom to connect chains or cables from the trailer to a portion of the pulling vehicle on opposite sides of the primary hitch. Failure of the hitch will then not result in the complete loss of control of the trailer, the chains still maintaining a certain degree of attachment to the towing vehicle. As is obvious, the trouble with this arrangement is simply the fact that the use of chains still establishes enough freedom between the trailer and the towing vehicle that the directional stability of the trailer is extremely bad. Applicant has provided one solution to this problem as is illustrated in his co-pending application Serial Number 107,921 filed on August 1, 1949 now Patent 2,614,861. The present invention operates on a different principle than that disclosed in the cited application.

The preferred form of the present invention provides a set of auxiliary tie rods on opposite sides of the hinge of a conventional primary hitch, with the rods transmitting biasing action tending to urge the trailer toward the pulling vehicle. One end of each of the rods is hooked in such a manner as to engage a suitable slot in the forward coupling member, and the presence of the biasing action prevents the rod from becoming accidentally disengaged. The primary purpose of the biasing action, however, is to maintain a secure connection without interfering with articulation. It is preferred that the structure of the hitch establish a limit to the forward movement of the trailer with respect to the vehicle on failure of the primary hinge bolt so that the biasing action operating through the rods is always present, and the rods will thereby continue to maintain their engaged position.

The several features of this invention will be discussed in detail through an analysis of the particular embodiments illustrated in the accompanying drawings. In these drawings.

Figure 1:
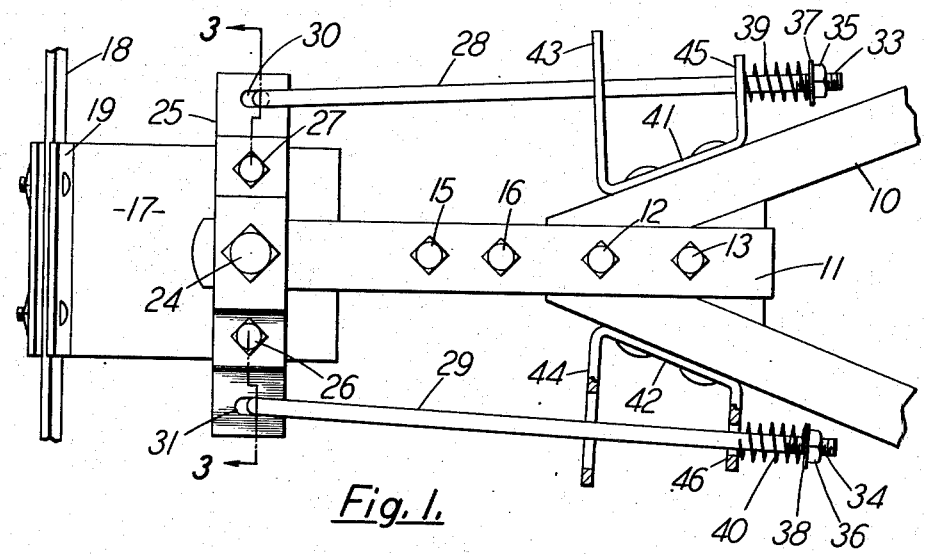
Figure 1 is a plan view of the trailer hitch system provided by the present invention, showing a portion of the forward end, or "tongue," of the trailer.

Referring to the drawings, the tongue of a trailer is shown as constructed of a V-shaped member 10 to which a bar 11 is secured by the bolts 12 and 13. A lower member 14 is secured to the bar 11 by the bolts 15 and 16 to create a fork adapted to receive the projecting member 17 in the space between the members 11 and 14. The projecting member 17 is securely attached to the bumper 18 of a towing vehicle by the clamping force established at the flanges 19 and 20 by the bolts 21 and 22 engaging the backplate 23. A hinge bolt 24 passes through a suitable aperture in the projecting member 17 and through similar apertures in the members 11 and 14 to establish the primary hinge connection between the trailer and the pulling vehicle. Preferably, the aperture in the projecting member 17 is of a diameter sufficiently in excess to the diameter of the bolt 24 to permit a limited degree of articulation on a horizontal axis without binding. Similarly, the spaced relationship existing between the forward section of the members 11 and 14 is such as to permit this same degree of articulation.

The transverse bar 25 is secured to the projecting member 17 by the bolts 26 and 27. The central-portion of the bar 25 is offset an amount sufficient to accommodate the thickness of the bar 11, together with a suitable amount of clearance to provide for the horizontal-axis articulation referred to above. The rods 28 and 29 are shown engaging the slots 30 and 31, respectively, at the outer extremities of the bar 25, the forward ends of these rods being hook-shaped as indicated at 32 in Figure 2. The dimensions of the slots 30 and 31 are such as to permit the withdrawal of the rods 28 and 29 upon sufficient forward movement to bring the front end of the rods in contact with the front ends of the slots.

The rearward portion of the rods 28 and 29 terminate in the threaded sections 33 and 34 to which the nuts 35 and 36 are assembled. These nuts retain the washers 37 and 38 which act as seats for the springs 39 and 40. Release of the biasing action established by the springs 39 and 40 can be affected by the loosening of the nuts 35 and 36. The rods 28 and 29 pass through suitable apertures in brackets 41 and 42 secured to the tongue 10 of the trailer by suitable bolts. The brackets 41 and 42 are provided with the outwardly-projecting legs 43 and 44 at the front, and 45 and 46 at the rear. The apertures provided in all of these legs are such as to permit the required articulation while still maintaining the rods attached to the trailer when it is not secured to a pulling vehicle. These brackets maintain the rods in approximately the location for ready attachment to the horizontal bar 25, and are much more satisfactory than would be the case if the rods were simply left dangling from a single point of support.

Figure 2:
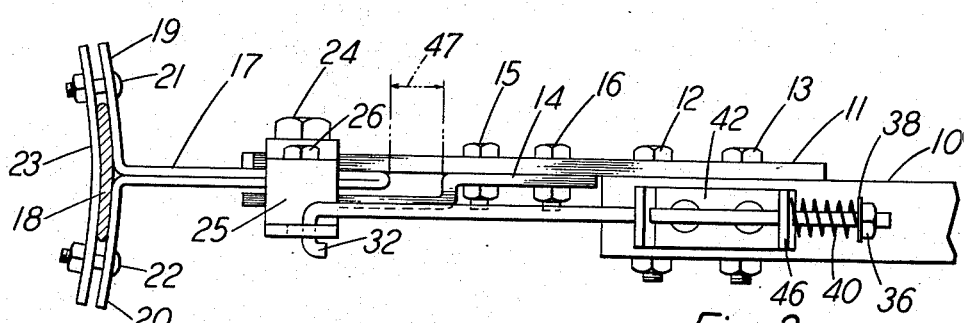
Figure 2 is a view in elevation of the mechanism shown in Figure 1, Figures 1 and 2 being in projection.
Figure 3:
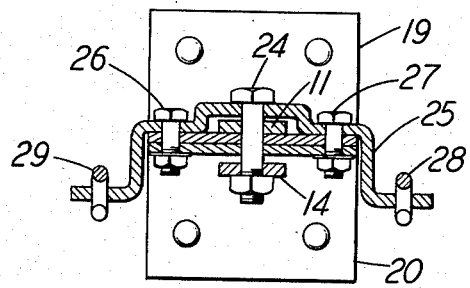
Figure 3 is a section taken on the plane 3—3 of Figure 1.

It is preferred that the distance 47 shown in Figure 2 between the rear end of the projecting member 17 and the base of the fork established by the members 11 and 14 be established at such an amount that the forward movement of the trailer relative to the vehicle (resulting in relative movement of the coupling members towards one another) on failure of the bolt 24 will not be sufficient to completely relieve the biasing action of the springs 39 and 40. In this fashion, the rods 28 and 29 are always maintained in secure engagement with the slots 30 and 31.

The particular features of the present invention that are illustrated in the accompanying drawings and discussed herein are for illustrative purposes only and are not to be considered as a limitation upon the scope of the appended claims. In these claims, it is my intention to claim the entire invention disclosed herein, except as I am limited by the prior art.

I claim:

1. A trailer hitch comprising: a coupling including first and second coupling members, said coupling members normally being hingedly interconnected at a hinge pin and having stop means limiting the movement of said coupling members towards one another on failure of said hinge pin; and safety connecting means including rod means disposed on opposite sides of said coupling and adapted for disengageable hook engagement at one end with an aperture in said first coupling member on forward movement of said rod means with respect to said first coupling member, bracket means fixed with respect to said second coupling member and supporting the opposite end of said rod means, and biasing means acting between said rod means and second coupling member urging said rod means in a direction to bring said coupling members together, said biasing means being adapted to maintain biasing action at least until engagement of said stop means.

2. A trailer hitch comprising: a coupling including first and second coupling members, said coupling members normally being hingedly interconnected; and safety connecting means including rod means disposed on opposite sides of said coupling and adapted for disengageable hook engagement at one end with an aperture in said first coupling member, said aperture being formed to admit and release said hook on vertical movement thereof at a forward position from normal load-transmitting position, bracket means fixed with respect to said second coupling member and supporting the opposite end of said rod means, and biasing means acting between said rod means and second coupling member urging said rod means in a direction to bring said coupling members together.

3. A trailer hitch comprising: a coupling including first and second coupling members, said coupling members normally being hingedly interconnected; and safety connecting means including rod means disposed on opposite sides of said coupling and adapted for disengageable hook engagement at one end with an aperture in said first coupling member on forward movement of said rod means with respect to said first coupling member, bracket means fixed with respect to said second coupling member on opposite sides thereof and pivotally supporting the opposite end of said rod means at spaced points for articulation limited to a plane substantially fixed with respect to said second coupling member, and biasing means acting between said rod means and second coupling member urging said rod means in a direction to bring said coupling members together.

References Cited in the file of this patent

UNITED STATES PATENTS

| Number | Name | Date |
| --- | --- | --- |
| 2,085,260 | Keys | June 29, 1937 |
| 2,225,130 | Otto | Dec. 17, 1940 |